United States Patent [19]

Sakairi

[11] Patent Number: 5,752,254
[45] Date of Patent: May 12, 1998

[54] METHOD AND SYSTEM FOR CONTROLLING CLIPBOARDS IN A SHARED APPLICATION PROGAM

[75] Inventor: Takashi Sakairi, Yamato, Japan

[73] Assignee: International Business Machine Corp., Armonk, N.Y.

[21] Appl. No.: 630,705

[22] Filed: Apr. 8, 1996

[30] Foreign Application Priority Data

May 26, 1995 [JP] Japan .................................. 6-127940

[51] Int. Cl.$^6$ .................................................. G06F 17/24
[52] U.S. Cl. ............... 707/530; 395/200.31; 395/200.42; 395/682; 345/330; 345/331
[58] Field of Search ....................... 395/330, 331, 395/200.07, 200.08, 200.43, 200.62, 200.72, 200.75, 200.31, 682; 707/530; 345/330–331

[56] References Cited

U.S. PATENT DOCUMENTS

| | | | |
|---|---|---|---|
| 5,008,853 | 4/1991 | Bly et al. | 364/900 |
| 5,301,268 | 4/1994 | Takeda | 395/157 |
| 5,313,581 | 5/1994 | Giokas et al. | 395/200 |
| 5,448,738 | 9/1995 | Good et al. | 395/700 |
| 5,515,491 | 5/1996 | Bates et al. | 395/155 |
| 5,564,044 | 10/1996 | Pratt | 395/600 |

*Primary Examiner*—Joseph H. Feild
*Assistant Examiner*—Jennifer C. Chen
*Attorney, Agent, or Firm*—A. Bruce Clay

[57] ABSTRACT

A group editor has a communication unit, an internal clipboard control unit, a system clipboard control unit, and an internal clipboard. The group editor operates to share the results of input and editing operations among a plurality of computer systems. An operating system clipboard is also provided. The system clipboard and the internal clipboard are linked by the communication unit, internal clipboard control unit, and system clipboard control unit, whereby the user only needs to perform an operation on one clipboard regardless of whether copy and paste between different applications or copy and paste within the same group editor, are performed. Therefore, usability increases, and traffic of the network is decreased.

8 Claims, 5 Drawing Sheets

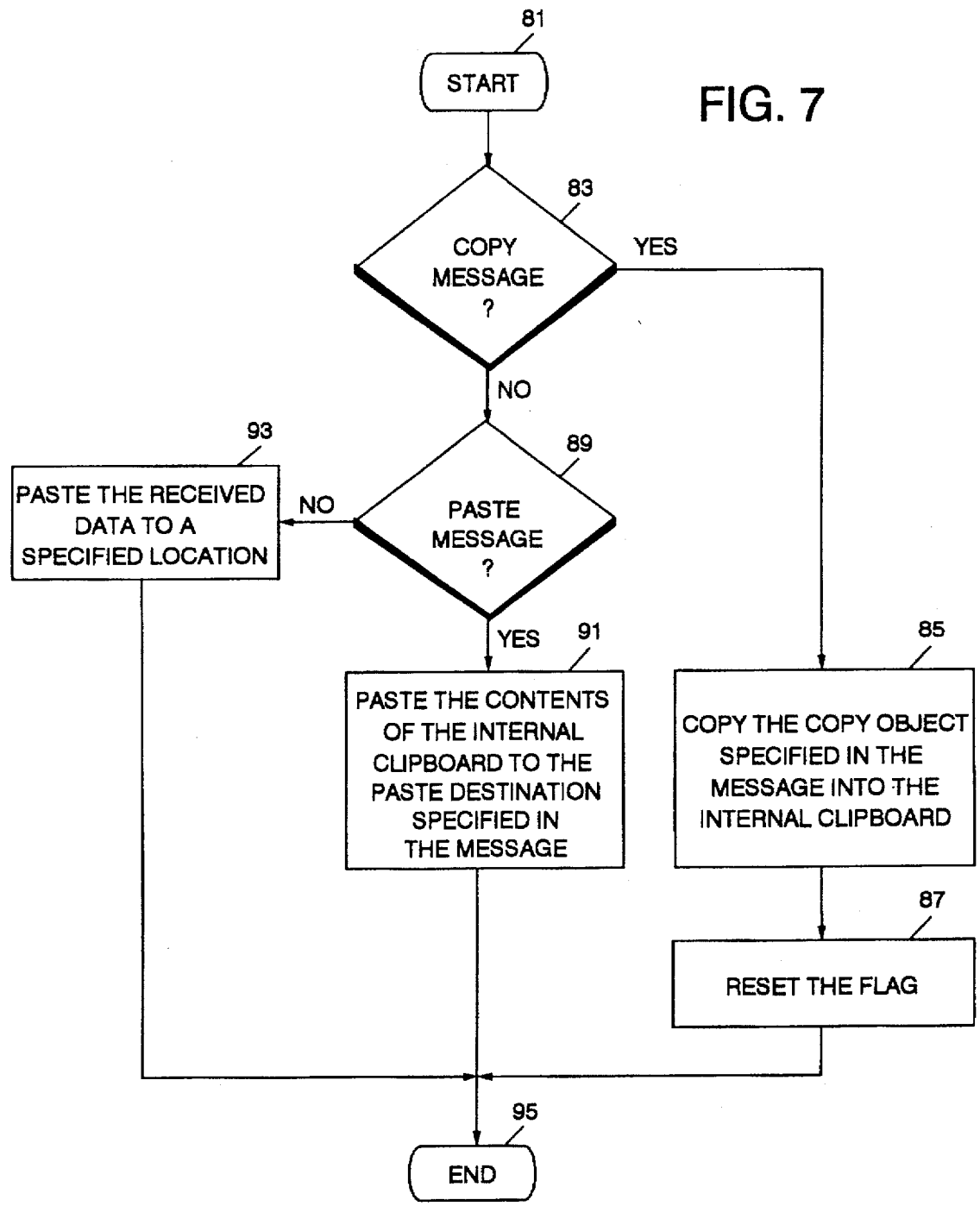

METHOD AND SYSTEM FOR CONTROLLING CLIPBOARDS IN A SHARED APPLICATION PROGAM

FIELD OF THE INVENTION

The present invention relates to control of clipboards in a shared application program, and specifically to a method and system for linking a system clipboard with a clipboard within a shared application program (internal clipboard).

BACKGROUND OF THE INVENTION

Many systems have been developed in which a plurality of computer systems are interconnected on a LAN (Local Area Network), ISDN (Integrated Service Digital Network), ordinary telephone circuit or the like, and a conference or cooperative work is performed by sharing an application program and data handled in the application program. Such application program for allowing a plurality of users to cooperatively perform an editing or the like by the use of their respective computer systems is called a shared application program. The shared application program is also known as a group editor.

There are two types of shared application programs, namely, distributed and concentrated types. In the concentrated type, there is actually only one application program. The input from a plurality of users is collectively inputted to the application program, and the output of the application program is sent to the computer systems of all the users. On the other hand, in the distributed type, the same application program is executed in all the computer systems, and the inputs by a plurality of users are sent to all the computer systems and executed there. The application program of the distributed type is herein discussed.

The operation of a clipboard in a shared application program is now considered. In an ordinary application program, the operation of "copying" to a clipboard and the operation of "pasting" from the clipboard are possible. Good operability is naturally obtained if the user can also use similar operations in a shared application program. Thus, the following conventional methods have been used for dealing with data by clipboards:

1. Method using only an internal clipboard

The internal clipboard is an inner clipboard managed by a shared application program itself. Since the internal clipboard is dedicated to the shared application program, the contents of the clipboard are never destroyed by other application programs. Accordingly, when an operation for the clipboard is performed, data itself related to the operation need not be sent to other computer systems. That is, it is only necessary to send the commands (messages) such as "copy" with a specification of a copy object and "paste" with a specification of a paste destination, and perform the operations such as "copying" and "pasting" in the individual computer systems (though the sequence of the commands such as "copy" and "paste" in all the systems is a problem). Since the data itself is not sent, the traffic of the communication network can be decreased. However, there is a disadvantage in that data cannot be sent to or received from other application programs.

2. Method using a system clipboard

The system clipboard is a clipboard managed by a window system (operating system). The system clipboard can be used to send or receive data between application programs. However, this clipboard is not shared and the system clipboard is independently changed in each of the interconnected computer systems, and thus it is difficult to maintain consistency as a system only with the commands such as "copy" and "paste." This requires that data should be sent at the time of a paste operation, which leads to the disadvantage that traffic increases accordingly.

3. Method using a shared system clipboard

The shared system clipboard means that a clipboard managed by a window system is shared, and the contents of the clipboard are always made to match each other in all the systems. In this method, the shared application program can perform clipboard-related operations by sending only the commands such as "copy" and "paste." However, the shared system clipboard needs to be kept in the same status, and thus the program managing the shared system clipboard must resend data each time the shared system clipboard is changed. Accordingly, this method provides the most amount of traffic.

4. Method using both internal and system clipboards

It is possible to provide both internal and system clipboards in which the user explicitly selects them. This method has the advantages of decreasing the traffic by using the internal clipboard and sending or receiving data between different application programs by using the system clipboard. However, there is a problem with usability since the user has to explicitly specify which clipboard is to be used.

U.S. patent application Ser. No. 08/149,487, assigned to the same assignee herein, contains a description of an invention related to the clipboard operation in a shared application program, but it contains no discussion of the usability and the traffic of all the systems as described above.

In view of the foregoing, it is an object of the present invention to decrease the traffic of all the systems in the clipboard operation in a distributed system using a plurality of computer systems, without degrading the usability.

SUMMARY OF THE INVENTION

To accomplish the above described object, the present invention is a group editor having an internal clipboard and operating to share the results of input and editing operations among a plurality of computer systems.

The invention comprises means for copying a copy object into the internal clipboard in response to a copy instruction with a specification of the copy object (internal clipboard control unit), means for setting an identifier for identifying the group editor means in a system clipboard, and copying the copy object into the system clipboard in response to the copy instruction (system clipboard control unit), and means for sending a copy message specifying the copy object to corresponding group editor means in other computer systems in response to the copy instruction (communication unit). The internal clipboard and the system clipboard are linked together, and the user can copy a copy object into a clipboard without being aware of whether it is the internal clipboard or the system clipboard. Up to this point of time, the communication cost is suppressed because only a copy message is sent.

Also necessary are means for checking if the identifier set in the system clipboard is equal to the identifier of the group editor means being pasted in response to an instruction of paste operation specifying a paste destination (system clipboard control unit), paste means for performing a paste operation from the internal clipboard of the group editor means being pasted to the specified paste destination if the result of the check by the checking means is true (internal clipboard control unit), and means for sending a paste message specifying a paste destination to the corresponding group editor means of other computer systems in response to the paste means (communication unit). Thus, if the check results by the first and second checking means are both true, it is possible to apply the same treatment as the above described case in which only the internal clipboard is provided, and the communication cost is minimum.

Further required are means for pasting data from the system clipboard if the check result is not true (system clipboard control unit), and means for sending data from the system clipboard to other computer systems with a specification of a paste destination if the check result is not true (communication unit). By this, the user only needs to be aware of one clipboard regardless of the fact that data can be sent to or received from application programs including group editor means (copying or pasting from an ordinary application program to group editor means is also possible).

Naturally, also necessary are means for copying into the internal clipboard when a copy message is received from any of the other computer systems (internal clipboard control unit), and means for performing a paste operation from the internal clipboard when the paste message to the group editor means is received from any of the other computer systems (communication unit).

In addition, the destruction of the contents of the internal clipboard can be dealt with if there are further means provided for setting a flag indicating that the computer system has performed a copy operation in response to a copy instruction, second checking means for checking if the flag is set when pasting is instructed, and means for resetting the flag when a copy message is received from any of the other computer systems (flag and flag control unit); and the paste means is activated if it is determined by the second checking means that the flag is set, and the means for pasting data and the means for sending data with a specification of a paste destination are activated if it is determined that the flag is not set.

The present invention is described below from another viewpoint. That is, the present invention comprises group editor means having a communication unit, internal clipboard control unit, system clipboard control unit, and internal clipboard, and operating to share the results of input and editing operations among a pluraliy of computers; and a system clipboard by an operating system, the group editor means being characterized in that: if the clipboard operation is completed by the internal clipboard control unit using only the internal clipboard in one group editor means, a copy message with a specification of a copy object, and a paste message with a specification of a paste destination are sent from the communication unit to other computer system by the communication unit; if data may need to be sent or received between different application programs including group editor means, the system clipboard control unit copies the copy object into the system clipboard; if the sending or receiving of data is actually performed, the system clipboard control unit performs a paste operation from the system clipboard to the paste destination, and the communication unit sends the contents of the system clipboard to the other computer system with a specification of a paste destination; if the message is received, the internal clipboard control unit performs an operation corresponding to the message; and if the contents of the system clipboard with a specification of the paste destination are received, the contents are pasted to the specified paste destination.

Further, it is possible that the system clipboard control unit performs the operation for the actual data sending or receiving if the contents of the internal clipboard are destroyed.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 7 is a high-level flowchart for explaining the operation of the clipboard control unit when data or a message is received from other computer system.

DETAILED DESCRIPTION OF THE INVENTION

Figure 1:
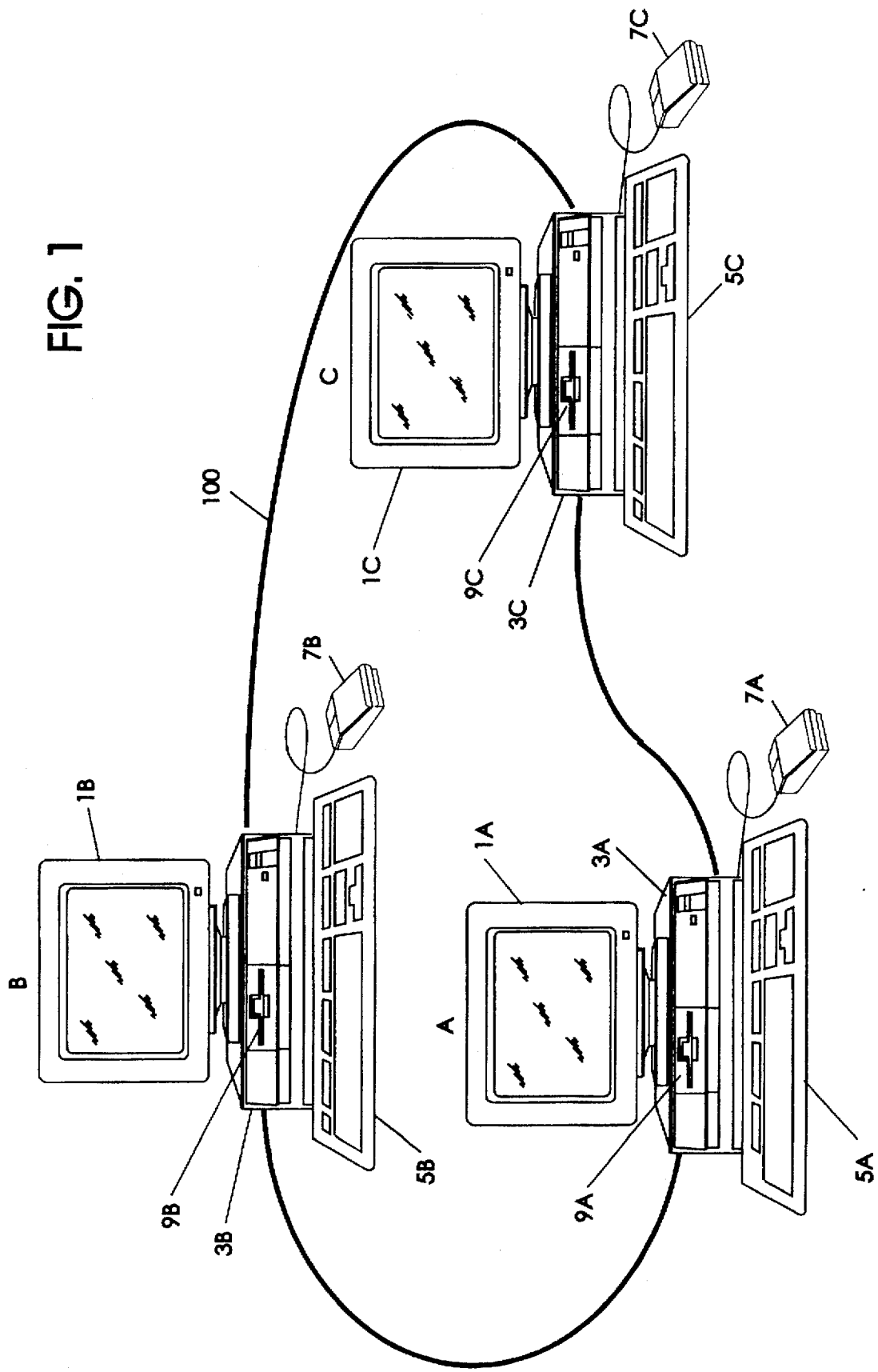
FIG. 1 schematically shows the general construction of the present invention.

The embodiment of the present invention is described with reference to FIG. 1. Computer systems A, B, and C are interconnected by a network 100 to make up a computer network system (distributed network system). The respective computer systems A, B, and C usually have a monitor 1A, 1B, or 1C, a main unit 3A, 3B, or 3C, an auxiliary storage 9A, 9B, or 9C provided in the main unit 3A, 3B, or 3C, a keyboard 5A, 5B, or 5C, and a mouse 7A, 7B, or 7C, respectively. Although not shown, the main unit 3A, 3B, or 3C has devices necessary for ordinary computers, such as an MPU, a main memory, an input/output control device and a storage, and execute an operating system such as a window system (including a network OS) and application programs (including shared application programs). Since the main units are conventional, further description is omitted. The network 100 may be a LAN, ISDN, or ordinary telephone circuit, and the positional relationships between the respective computer systems are also unrelated to the present invention.

Although the present invention needs no server computer since it also belongs to the distributed type in a shared application system, as described above, one or more server computers may be provided in the network system. Further, when it is used as a conference system, though not shown, a camera may be provided in each computer system to send pictures. Other input devices, such as a pen input device, may be connected. Output devices such as printers and plotters may be optionally connected.

In such a computer network system, by sharing data from a plurality of computer systems, and sharing the result of an editing operation on the input data, the cooperative works by a plurality of users can be made efficient. That is, by using a shared application program, the work of each user is immediately sent to other users, reflecting the result. In addition, by providing a camera or the like, a conference can be held even if all the people performing a cooperative work do not gather in the same place, and thus the work can be performed as usual even at a remote place.

Figure 2:
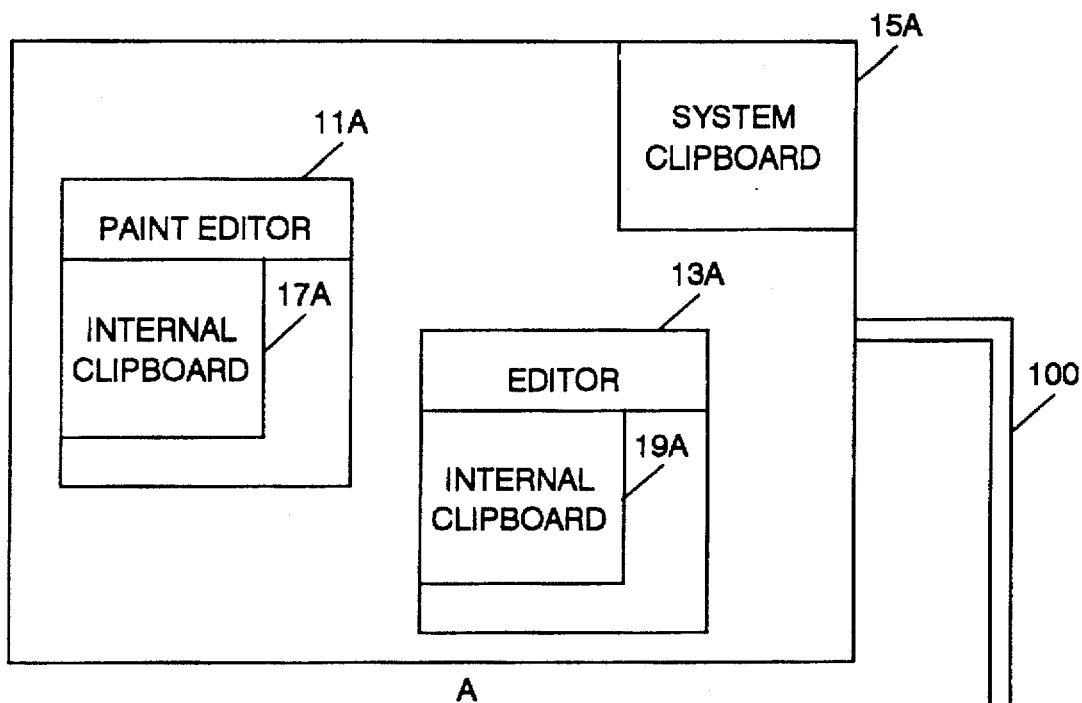
FIG. 2 is a block diagram of the computer system shown in FIG. 1.
Figure 2:
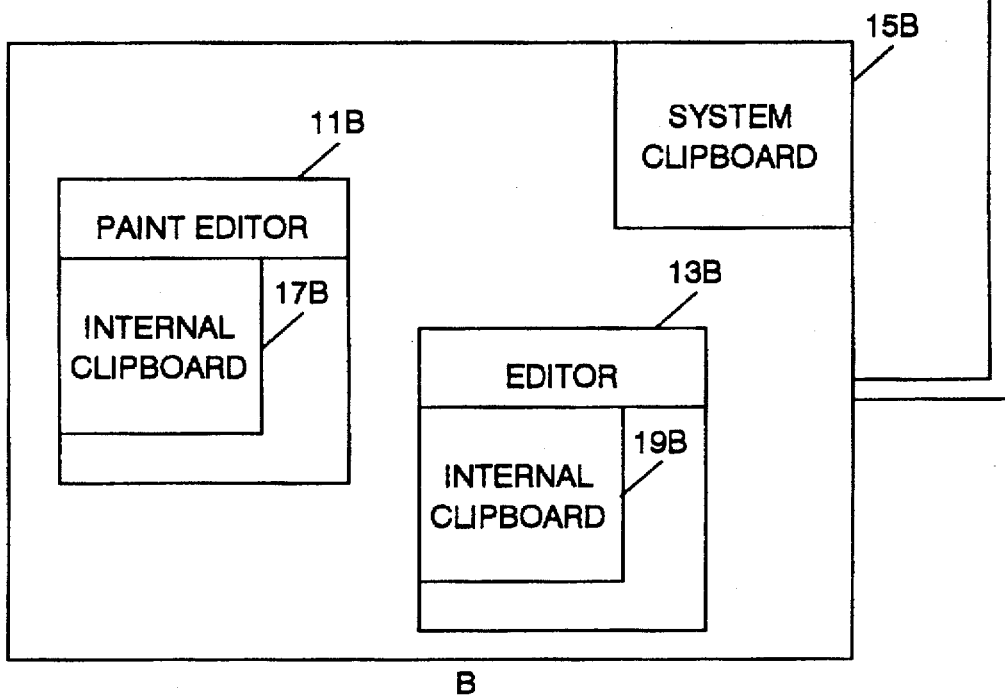

Now, the relationships between the shared application program of the present invention and the clipboards are described by using FIG. 2. On the computer system A, a paint editor 11A and an editor 13A are running. The editors have internal clipboards 17A and 19A, respectively. Further, the operating system has a system clipboard 15A, and the present invention links the two clipboards. In addition, on the computer system B connected by the network 100, a paint editor 11B and an editor 13B respectively corresponding to the two editors running on the computer system A are running. Similarly, each editor has internal clipboards 17B and 19B. The operating system has a system clipboard 15B.

Since the above described shared application is merely exemplary, alternative ones may be used, and the number of them is not limited to two. Further, the same shared application program may be simultaneously executed in a plural number. Moreover, application programs other than shared application programs may be executed. In addition, any operating system may be used, but, if it is a window system, the operation is easy and the clipboard can also easily be operated.

In the construction as shown in FIG. 2, a first user operating the computer system A may move, for instance, an image drawn in the paint editor 11A to another place in the same paint editor 11A, or may copy a sentence typed in the editor 13A into a specified place in the paint editor 11A. Such operation, also must be reflected onto the paint editor 11B of the computer system B. Similarly, a second user operating the computer system B may move, for instance, an image drawn in the paint editor 11B to a certain place in the editor 13B, or may copy a sentence typed in the editor 13B into a different place in the same editor 13B. This operation also must be reflected onto the editor 13A of the computer system A.

Figure 3:
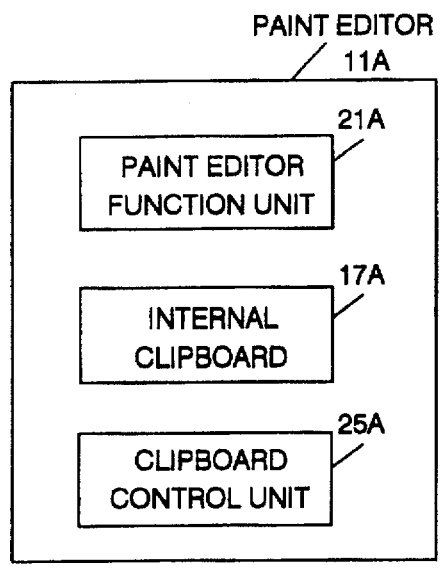
FIG. 3 is a block diagram of a shared application program.

Although such copy and move operations are usually performed using clipboards, the operation within the same shared application program, the operation between shared application programs, and the operation between an ordinary application program which is not a shared application program and a shared application program should be equivalent for the user. Thus, the construction as shown in FIG. 3 is required. This represents the paint editor 11A (shown in FIG. 2) as an example. The paint editor 11A is made up of a paint editor function unit 21A for performing the primary function of the paint editor, an internal clipboard 17A, and a clipboard control unit 25A for controlling the operation of the clipboard. The primary function of the paint editor includes a function of drawing, for instance, lines or figures of various colors, and the like (further description is omitted since it is not directly related to the present invention). However, it is noted that the function as a shared application program, which is not pertinent to the clipboard, is also included in this portion. Further, the internal clipboard 17A means the clipboard managed by the shared application program itself, as described above. In addition, the clipboard control unit 25A carries out general controls for communication between the internal clipboard 17A, the system clipboard 15A, and other computer systems.

Figure 4:
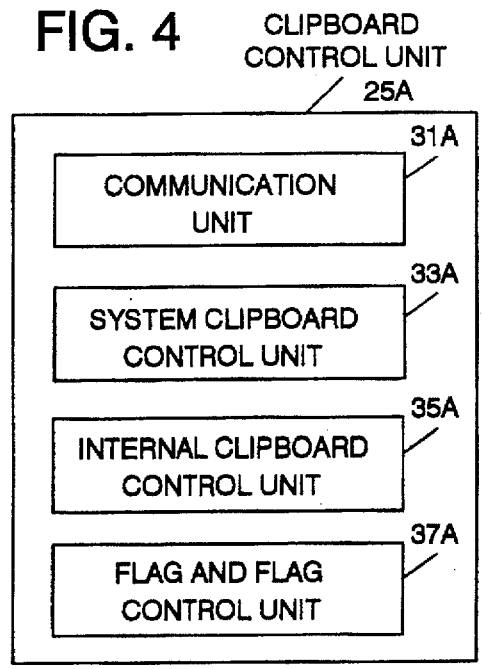
FIG. 4 is a block diagram of the clipboard control unit.

The detailed description of the clipboard control unit 25A is shown in FIG. 4. The clipboard control unit 25A consists of a communication unit 31A, a system clipboard control unit 33A, an internal clipboard control unit 35A, and a flag and flag control unit 37A. The communication unit 31A communicates with other computer systems. The system clipboard control unit 33A operates the system clipboard 15A. The internal clipboard control unit 35A operates the internal clipboard 17A. The flag and flag control unit 37A has a flag for indicating that the user has performed an operation of copying into a clipboard for the shared application program, and also has a control unit for controlling and checking the setting and resetting of the flag.

Figure 5:
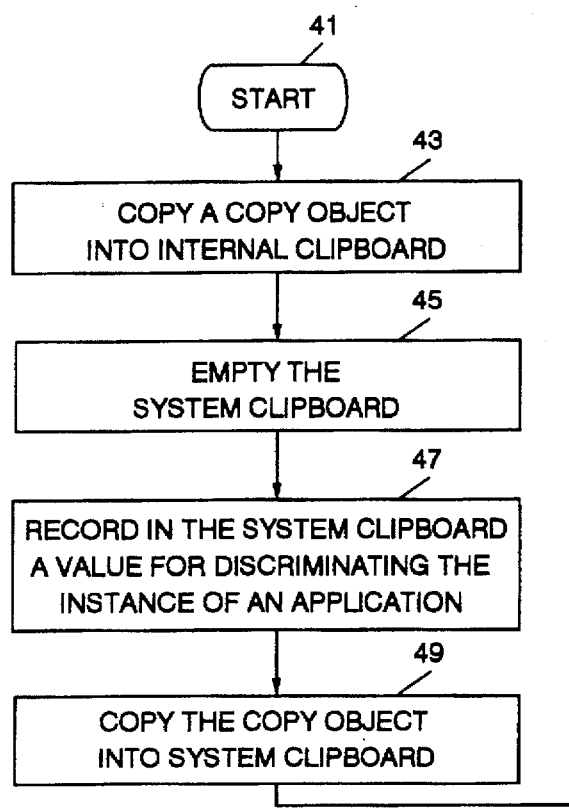
FIG. 5 is a high-level flowchart for explaining the operation of the clipboard control unit when the user instructs a copying into a clipboard.
Figure 5:
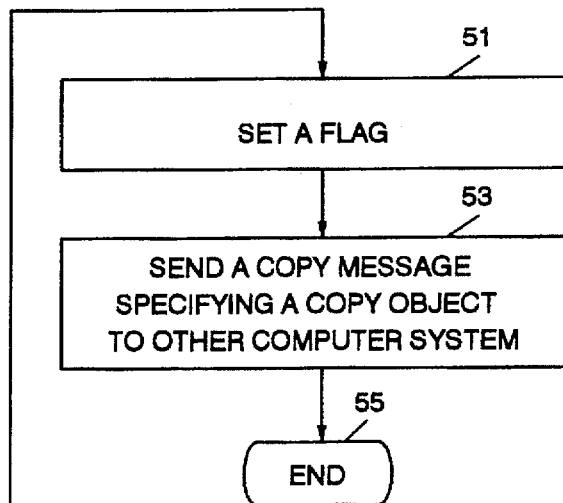
Figure 6:
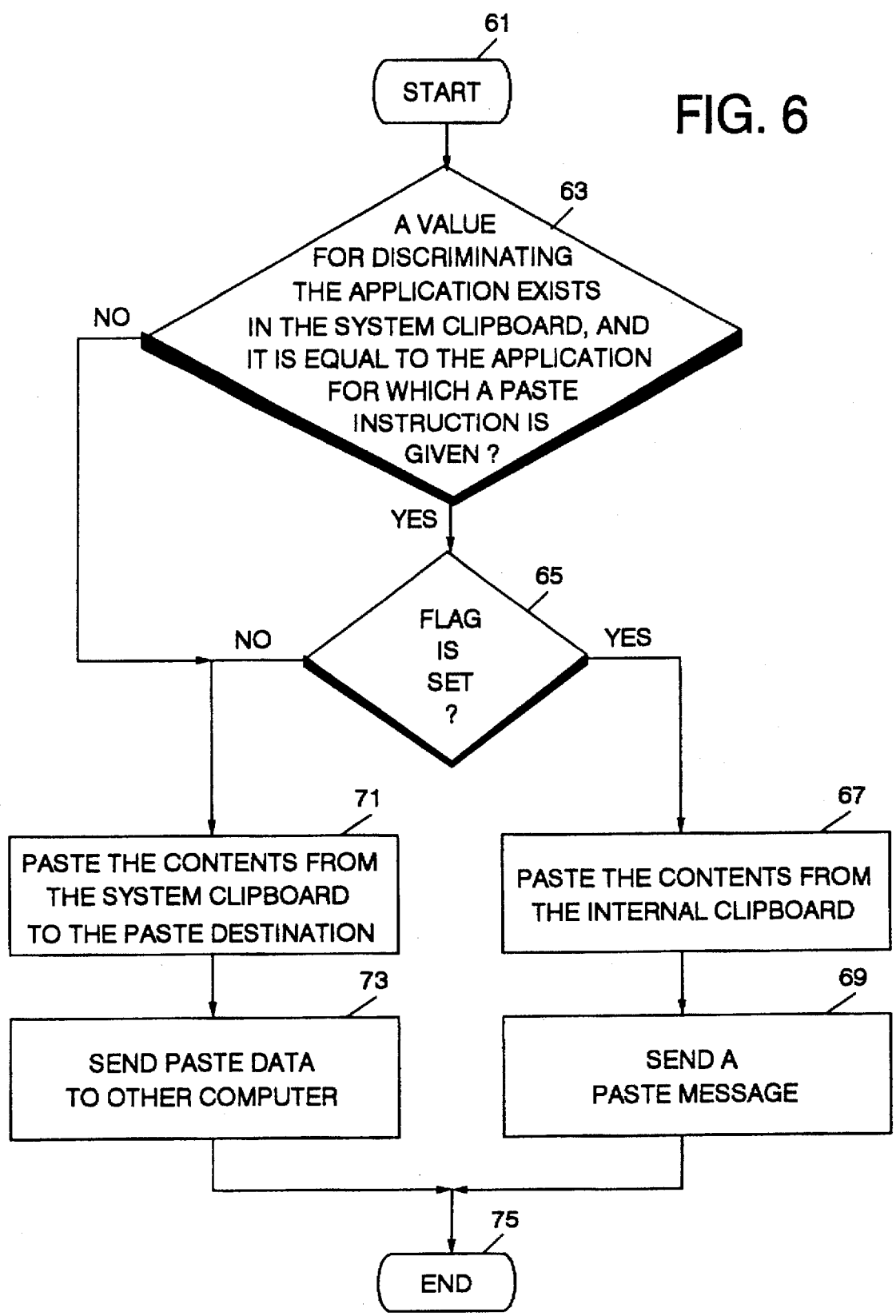
FIG. 6 is a high-level flowchart for explaining the operation of the clipboard control unit when the user instructs a pasting from a clipboard.

The operation of each structural element of the clipboard control unit 25A is described with reference to FIGS. 5, 6 and 7. Although not specifically depicted in these figures, the above flag is reset to activate the shared application program related to the present invention.

1. When the user instructs a "copying" into a clipboard (FIG. 5), the user usually specifies a copy object and then issues an instruction of copy. In a window system, a region is specified by dragging the mouse 7A (see FIG. 1), and then an operation such as clicking the copy menu is performed. At this time, the internal clipboard control unit 35A copies the specified copy object into the internal clipboard 17A (step 43). The system clipboard control unit 33A empties the system clipboard 15A (step 45) (see FIG. 2), and records in the system clipboard 15A a value for discriminating the instance of a shared application program (step 47). Since a plurality of shared application programs can be executed in one computer system, information is insufficient if only the types of the shared application programs are discriminated. For MS-Windows (a trademark of Microsoft Corp.), the handle of the instance is recorded. This is to indicate that the system clipboard 15A and the internal clipboard 17A have the same data recorded therein. Then, the system clipboard control unit 33A copies the copy object into the system clipboard 15A (Step 49). Further, the flag and flag control unit 37A sets the above described flag (step 51) to clearly indicate the shared application program of the computer system which has performed the copy operation. The communication unit 31A sends a copy message specifying a region of the copy object, for instance, a starting point and an endpoint, to the corresponding shared application program of another computer system (step 53). Accordingly, data itself is not sent and the traffic in the network can be decreased.

2. When the user instructs a "pasting" from a clipboard (FIG. 6). The user performs a "pasting" operation after he performs a copy operation. Usually, he clicks the paste menu with the mouse 7A. The system clipboard control unit 33A (FIG. 4) checks if the instance of a shared application program is contained in record of the system clipboard 15A, and if contained, it checks to see that it is the same instance as the shared application program which issued the paste instruction (step 63). If the check in step 63 is passed, the flag and flag control unit 37A further checks if a flag is set (step 65). By these checks, it is determined to be a pasting within the same shared application program of the computer system which performed the copying into the clipboard. Since this case is no different than the case using only the internal clipboard previously described, the internal clipboard control unit 35A pastes the content recorded in the internal clipboard 17A to a specified paste destination (step 67). Then, the communication unit 31A sends a paste message specifying a paste destination to another computer system (step 69).

However, if even one of the above two checks cannot be passed, operation of only the internal clipboard 17A is insufficient. For instance, for data passing between different shared application programs, data cannot be copied and pasted without using the system clipboard 15A. Further, there may be a case in which, even in the same shared application program, after a copying is performed in the computer system A, the same shared application program of the computer system B performs another copy operation to send a copy message, and the portion corresponding to the copy message is copied into the internal clipboard 17A by an operation described later. At this point, if only the internal clipboard 17A is used because the user of the computer system A instructed a paste operation within the same shared application program, it would be contrary to the user's intention. Accordingly, if even one of the two checks cannot be passed, the system clipboard control unit 35A pastes the contents of the system clipboard 15A to the paste destination (step 71). Then, the communication unit 31A sends the contents of the system clipboard 15A and the paste destination (the instance and the internal location of the shared application program, and the like) to another computer system (step 73).

3. When data is received from another computer system (FIG. 7). In this case, a copy message and a paste message have already been sent to the corresponding shared application program, and thus the reception is definite (it is assumed here that the computer system B has received them). For the copy message (Step 83), the internal clipboard control unit (similar to control unit 35A, FIG. 4) copies the copy object specified in the copy message into the internal clipboard 17B (step 85). Further, the flag and flag control unit (similar to control unit 37A, FIG. 4) resets the flag (step 87). This is to clearly indicate that the receiving shared application program has not performed the "copy" operation. In addition, when the paste message is received, the communication unit 31B activates the internal clipboard control unit 35B, which pastes the contents of the internal clipboard 17B to the paste destination specified in the paste message (step 91).

Not only a message but also data itself is sometimes received from another computer system. Since, in this case, a paste destination is also received, the shared application program which is the paste destination is found out, and the received data is pasted to a location in the program (step 93). If the communication unit 31B is aware that the destination is itself, the communication unit 31B directly pastes the data to a specified location. This is because it cannot be pasted to either the system clipboard or the internal clipboard. However, it is also possible to previously determine which control unit is to deal with such data, and make the communication unit 31B instruct such control unit to perform the paste operation of the received data.

As described above, the communication unit 31, system clipboard control unit 33, internal clipboard control unit 35, and flag and flag control unit 37 cooperatively perform clipboard operations, as if only one clipboard is provided to the user.

The above described embodiment is merely an example, and various modifications are available. For instance, although the flag is provided in each shared application program, it may be collectively managed on the operating side for the shared application programs which are running. The data format within the system clipboard is free, and it is only necessary that there be an existing portion for recording a value (identifier) for discriminating shared application programs and a portion for recording data itself.

Thus, the present invention could decrease the traffic of the whole system in the clipboard operation in a distributed system using a plurality of computer systems, without degrading usability.

Although the present invention has been described with respect to a specific preferred embodiment thereof, various changes and modifications may be suggested to one skilled in the art, and it is intended that the present invention encompass such changes and modifications as fall within the scope of the appended claims.

I claim:

1. A group editor which operates to share the results of input and editing operations for a computer network system having a plurality of computer systems, each of the computer systems having an internal clipboard associated with the group editor and a system clipboard associated with the computer systems, the group editor comprising:

means for copying a copy object into said internal clipboard in response to a copy instruction with a specification of said copy object;

means for setting a group editor identifier in said system clipboard, and copying said copy object into said system clipboard in response to said copy instruction;

means for sending a copy message specifying said copy object to said plurality of computer systems in response to said copy instruction;

means responsive to an instruction from the group editor to execute a paste operation specifying a paste destination for determining if a group editor identifier set in the system clipboard identifies the group editor;

means for performing a paste operation from the internal clipboard to said specified paste destination if said group identifier set in the system clipboard identifies the group editor;

means for sending a paste message specifying a paste destination to said other computer systems in response to said means for performing a paste operation;

means for pasting data from said system clipboard if said group identifier set in the system clipboard does not identify the group editor;

means for sending data from said system clipboard to said other computer systems with a specification of a paste destination if said group identifier set in the system clipboard does not identify the group editor;

means for copying into said internal clipboard when said copy message is received from any of said other computer systems; and means for performing a paste operation from said internal clipboard when said paste message is received from any of said other computer systems.

2. A computer network system as set forth in claim 1 further comprising:

means for setting a flag indicating that said computer system has performed a copy operation in response to said copy instruction;

second checking means for checking if said flag is set when pasting is instructed; and means for resetting said flag when said copy message is received from any of said other computer systems;

wherein said means for performing a paste operation from the internal clipboard to said specified paste destination is activated if it is determined by said second checking means that said flag is set, and said means for pasting data and said means for sending data with a specification of a paste destination are activated if it is determined that said flag is not set.

3. A plurality of computer systems used in a distributed network system, each of said plurality of computer systems comprising group editor means having an internal clipboard, and operating to share the results of input and editing operations among said plurality of computer systems, each of said plurality of computer systems further comprising an associated system clipboard, said group editor means on each of said plurality of computer systems further comprising:

means for copying a copy object into said internal clipboard in response to a copy instruction with a specification of said copy object;

means for setting an identifier for identifying the group editor means in said system clipboard, and copying said copy object into said system clipboard in response to said copy instruction;

means for sending a copy message specifying said copy object to corresponding group editor means in other said computer systems in response to said copy instruction;

checking means for checking if said identifier set in said system clipboard is equal to the identifier of the group editor means being pasted in response to an instruction of paste operation specifying a paste destination;

paste means for performing a paste operation from the internal clipboard of said group editor means being pasted to said specified paste destination if the result of the check by said checking means is true;

means for sending a paste message specifying a paste destination to corresponding group editor means in said other computer systems in response to said paste means;

means for pasting data from said system clipboard if said check result is not true;

means for sending data from said system clipboard to said other computer systems with a specification of a paste destination if said check result is not true;

means for copying into said internal clipboard when said copy message is received from any of said other computer systems; and means for performing a paste operation from said internal clipboard when said paste message to the group editor means is received from any of said other computer systems.

4. Computer systems as set forth in claim 3 further comprising:

means for setting a flag indicating that said computer system has performed a copy operation in response to said copy instruction;

second checking means for checking if said flag is set when pasting is instructed; and means for resetting said flag when said copy message is received from any of said other computer systems;

wherein said paste means for performing a paste operation from the internal clipboard of said group editor means being pasted to said specified paste destination is activated if it is determined by said second checking means that said flag is set, and said means for pasting data and said means for sending data with a specification of a paste destination are activated if it is determined that said flag is not set.

5. In a computer network system having a plurality of computers, each of said plurality of computers comprising group editor means having an internal clipboard, and operating to share the results of input and editing operations among said plurality of computers, each of said plurality of computer systems further comprising an associated system clipboard, a clipboard control method for linking said internal clipboard and said system clipboard, said method comprising the steps of:

copying a copy object into said internal clipboard in response to a copy instruction with a specification of said copy object;

setting an identifier for identifying the group editor means in said system clipboard, and copying said copy object into said system clipboard in response to said copy instruction;

sending a copy message specifying said copy object to corresponding group editor means in other said computer systems in response to said copy instruction;

checking if said identifier set in said system clipboard is equal to the identifier of the group editor means being pasted in response to an instruction of paste operation specifying a paste destination;

performing a paste operation from the internal clipboard of said group editor means being pasted to said specified paste destination if the result of the check by said checking step is true;

sending a paste message specifying a paste destination to the corresponding group editor means in said other computer systems in response to said paste step;

pasting data from said system clipboard if said check result is not true;

sending data from said system clipboard to said other computer systems with a specification of a paste destination if said check result is not true;

copying into said internal clipboard when said copy message is received from any of said computer systems; and performing a paste operation from said internal clipboard when said paste message to the group editor means is received from any of said other computer systems.

6. A clipboard control method as set forth in claim 5 further comprising the following steps:

setting said flag indicating that said computer system has performed a copy operation in response to said copy instruction;

checking if said flag is set when a paste is instructed; and resetting said flag when said copy message is received from any of said other computer system; wherein said step of performing a paste operation from the internal clipboard of said group editor means being pasted to said specified paste destination is activated if it is determined by said step of checking if said flag is set that said flag is set, and said step of pasting data and said step of sending data with a specification of a paste destination are activated if it is determined that said flag is not set.

7. A system for for sharing editing information between a shared application program executing on a first computer and an associated shared application program executing on a second computer, the system comprising:

an internal clipboard associated with the shared application program executing on said first computer;

a system clipboard associated with the first computer, said system clipboard being accessible to applications programs executing on said first computer;

means for copying a copy object into the internal clipboard responsive to a copy instruction provided by a user of the shared application program executing on the first computer specifying the copy object;

means for setting a group editor identifier in the system clipboard and for copying the copy object into the system clipboard responsive to the copy instruction;

means for sending a copy message specifying the copy object to the associated shared application program executing on the second computer responsive to said copy instruction;

means for determining if an identifier set in the system clipboard identifies the shared application program executing on the first computer responsive to a paste instruction provided by a user of the shared application program executing on the first computer specifying a paste destination;

means for performing a paste operation from the internal clipboard to the specified paste destination if the identifier set in the system clipboard identifies the shared application program executing on the first computer;

means for sending a paste message specifying a paste destination to the second computer responsive to said means for performing a paste operation;

means for pasting data from the system clipboard if the identifier set in the system clipboard does not identify the shared application program executing on the first computer;

means for sending data from the system clipboard to the associated applications program executing on the second computer with a specification of a paste destination if the identifier set in the system clipboard does not identify the shared application program executing on the first computer;

means for receiving a shared copy instruction specifying a shared copy object from the associated applications program executing on the second computer;

means for copying the specified shared copy object into the internal clipboard responsive to the means for receiving a shared copy instruction;

means for receiving a shared paste instruction from the associated applications program executing on the second computer; and means for performing a paste operation from the internal clipboard responsive to the means for receiving a shared paste instruction.

8. A computer program product for sharing editing information between a shared application program executing on a first computer and having an associated internal clipboard and an associated shared application program executing on a second, the first computer having an associated system clipboard, the computer program product comprising:

a computer-readable storage medium having computer-readable program code means embodied in said medium, said computer-readable program code means comprising:

computer-readable program code means for copying a copy object into the internal clipboard responsive to a copy instruction provided by a user of the shared application program executing on the first computer specifying the copy object;

computer-readable program code means for setting a group editor identifier in the system clipboard and for copying the copy object into the system clipboard responsive to the copy instruction;

computer-readable program code means for sending a copy message specifying the copy object to the associated shared application program executing on the second computer responsive to said copy instruction;

computer-readable program code means for determining if an identifier set in the system clipboard identifies the shared application program executing on the first computer responsive to a paste instruction provided by a user of the shared application program executing on the first computer specifying a paste destination;

computer-readable program code means for performing a paste operation from the internal clipboard to the specified paste destination if the identifier set in the system clipboard identifies the shared application program executing on the first computer;

computer-readable program code means for sending a paste message specifying a paste destination to the second computer responsive to said computer-readable program code means for performing a paste operation;

computer-readable program code means for pasting data from the system clipboard if the identifier set in the system clipboard does not identify the shared application program executing on the first computer;

computer-readable program code means for sending data from the system clipboard to the associated applications program executing on the second computer with a specification of a paste destination if the identifier set in the system clipboard does not identify the shared application program executing on the first computer;

computer-readable program code means for receiving a shared copy instruction specifying a shared copy object from the associated applications program executing on the second computer;

computer-readable program code means for copying the specified shared copy object into the internal clipboard responsive to the computer-readable program code means for receiving a shared copy instruction;

computer-readable program code means for receiving a shared paste instruction from the associated applications program executing on the second computer; and computer-readable program code means for performing a paste operation from the internal clipboard responsive to the computer-readable program code means for receiving a shared paste instruction.

* * * * *